US009047555B2

(12) United States Patent
Kishino et al.

(10) Patent No.: US 9,047,555 B2
(45) Date of Patent: Jun. 2, 2015

(54) IMAGE PROCESSING APPARATUS AND METHOD

(71) Applicant: CANON KABUSHIKI KAISHA, Tokyo (JP)

(72) Inventors: Mayuko Kishino, Tokyo (JP); Shinichi Miyazaki, Kawasaki (JP); Takahisa Akaishi, Kawasaki (JP); Toshiki Miyazaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/959,255

(22) Filed: Aug. 5, 2013

(65) Prior Publication Data

US 2014/0043628 A1 Feb. 13, 2014

(30) Foreign Application Priority Data

Aug. 7, 2012 (JP) .................................. 2012-175409
Aug. 7, 2012 (JP) .................................. 2012-175410
May 30, 2013 (JP) .................................. 2013-114245

(51) Int. Cl.
*H04N 1/40* (2006.01)
*G06K 15/02* (2006.01)
*H04N 1/46* (2006.01)

(52) U.S. Cl.
CPC .............. *G06K 15/1878* (2013.01); *H04N 1/46* (2013.01)

(58) Field of Classification Search
USPC ........... 358/1.9, 2.1, 515–523, 525, 500, 504, 358/529–530; 382/162–169, 300
See application file for complete search history.

(56) References Cited

U.S. PATENT DOCUMENTS 6,628,825 B1 * 9/2003 Yamazoe et al. .............. 382/167
7,453,602 B2 * 11/2008 Shimada ........................ 358/1.9
7,463,386 B2 * 12/2008 Misumi ......................... 358/1.9

FOREIGN PATENT DOCUMENTS

JP          2008-072208 A       3/2008

* cited by examiner

*Primary Examiner* — Thomas D Lee
*Assistant Examiner* — Stephen M Brinich
(74) *Attorney, Agent, or Firm* — Canon USA Inc IP Division

(57) ABSTRACT

An apparatus sets a chromaticity point serving as a gray reference in a color gamut of a color space that an output device is able to output, specifies, in the color gamut of the color space that the output device is able to output, a first minimum lightness point on a lightness axis of the set chromaticity point and a second minimum lightness point that is achromatic, and generates a gray line that passes through a black point that is a minimum lightness point on a line connecting the first minimum lightness point and the second minimum lightness point, the first minimum lightness point, and the set chromaticity point and reaches a white point in the color gamut of the color space that the output device is able to output.

15 Claims, 21 Drawing Sheets

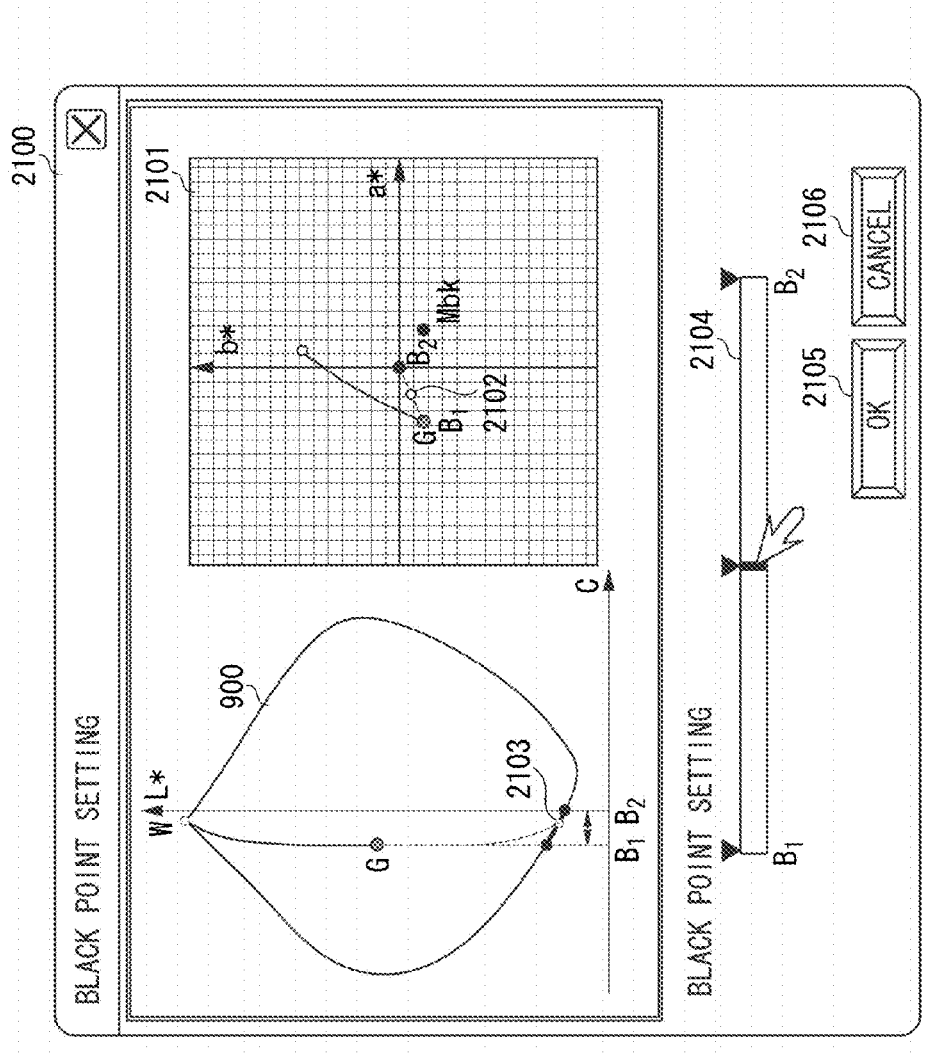

IMAGE PROCESSING APPARATUS AND METHOD

BACKGROUND OF THE INVENTION

1. Field of the Invention

The present disclosure relates to an apparatus and a method for performing image processing based on a gray line.

2. Description of the Related Art

When print data for printing a monochrome image on a recording medium is generated, a gray line which connects a white color and a black color is set. Input image data is then converted according to the gray line, so that the print data is generated. In such a case, the white color on the recording medium is determined by a base color (i.e., paper white) of the recording medium such as a printing sheet. Further, the black color on the recording medium is determined by a color of a color material applied to the recording medium, such as ink and toner. An achromatic axis (i.e., the gray line) in a color space is defined as a line connecting a paper white point and a black color point. The black color may be reproduced as a process black in which color materials such as cyan, magenta, and yellow are added to a black color material for the following reason. A tint can be changed by mixing other color materials with the black color material, so that a color such as a deeper gray can be expressed. However, if the paper white point and the black point are displaced from the achromatic axis and the tint is added, the change in the tint becomes conspicuous on the gray line between the paper white point and the black point, depending on how the gray line connects the points. Reproduction of an appropriate gray line may thus be deteriorated.

Japanese Patent Application Laid-Open No. 2008-072208 discusses maintaining reproduction of the gray line in a predetermined lightness range, and, further, controlling the reproduction of the gray line in the other range so that chromaticity smoothly changes from the paper white point and the black point.

However, if hue angles of a gray chromaticity point and a black chromaticity point are greatly different, a feeling of strangeness is provided to a viewer in a portion from a low lightness area to the black color. Such a feeling of strangeness is provided even when the gray line reproduction is controlled so that the chromaticity smoothly changes from the paper white point to the black point.

SUMMARY OF THE INVENTION

An embodiment of the present invention is directed to providing an apparatus and a method for solving the above-described problem. Further, an embodiment of the present invention is directed to providing an apparatus and a method for generating an appropriate gray line.

According to an aspect of the present invention, an apparatus includes a setting unit configured to set a chromaticity point serving as a gray reference in a color gamut of a color space that an output device is able to output, a first specifying unit configured to specify a first minimum lightness point on a lightness axis of the chromaticity point set by the setting unit in the color gamut of the color space that the output device is able to output, a second specifying unit configured to specify a second minimum lightness point that is achromatic in the color gamut of the color space that the output device is able to output, and a generation unit configured to generate a gray line that passes through a black point that is a minimum lightness point on a line connecting the first minimum lightness point specified by the first specifying unit and the second minimum lightness point specified by the second specifying unit, the first minimum lightness point, and the chromaticity point set by the setting unit and reaches a white point in the color gamut of the color space that the output device is able to output.

Further features of the present invention will become apparent from the following detailed description of exemplary embodiments with reference to the attached drawings.

BRIEF DESCRIPTION OF THE DRAWINGS

FIG. 21 illustrates a setting screen for the user to set the black point.

DESCRIPTION OF THE EMBODIMENTS

Various exemplary embodiments, features, and aspects of the invention will be described in detail below with reference to the drawings.

The exemplary embodiments to be described below do not limit the invention according to a scope of claims, and not all of the combinations of the features described in the exemplary embodiments are necessary as means for solving the problems in the present invention.

Figure 1:
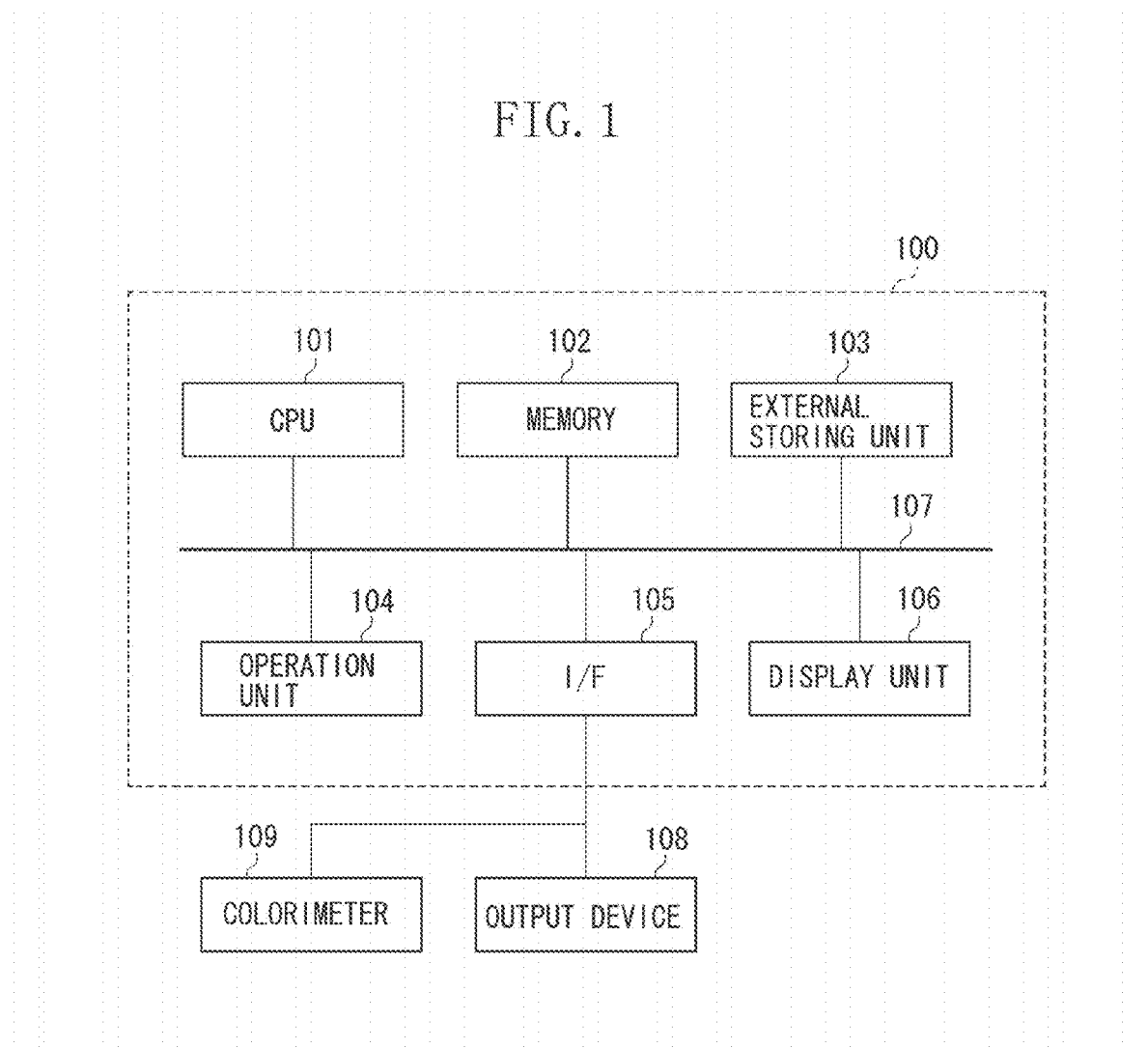
FIG. 1 illustrates a hardware configuration of an image processing apparatus.

FIG. 1 illustrates the hardware configuration of the image processing apparatus according to a first exemplary embodiment of the present invention. According to the present exemplary embodiment, a general-purpose personal computer (PC) is used as the image processing apparatus. Referring to FIG. 1, an image processing apparatus 100 includes a central processing unit (CPU) 101, a memory 102, an external storing unit 103, an operation unit 104, an interface (I/F) 105, and a display unit 106. The CPU 101 executes data and programs which are stored in the memory 102 and realizes the processes according to the present exemplary embodiment. The programs and the data are loaded to the memory 102 from the external storing unit 103 such as a hard disk. The operation unit 104 such as a keyboard and a pointing device receives input of a user instruction. The display unit 106, i.e., a display, displays the setting screen for prompting the user to input an instruction, and progress and result of the process, based on control performed by the CPU 101.

The image processing apparatus 100 is connected via the I/F 105 to an output device 108 and a colorimeter 109 to communicate with each other. The image processing apparatus 100 is thus capable of controlling the output device 108 and the colorimeter 109. The output device 108 prints an image on the recording medium based on the image data transmitted from the image processing apparatus 100, and displays the image on a display (not illustrated). According to the present exemplary embodiment, the output device 108 is an inkjet recording device which records the image by applying ink on the recording medium. Further, the output device 108 may be integrated with the image processing apparatus 100. The output device may also be realized as a recording device employing an electrophotographic method, a heat transfer method, and a dot impact method. The colorimeter 109 such as a spectral reflectance measurement device performs color measurement (i.e., measures reflectance for each predetermined wavelength) of a patch recorded by the output device 108, and transmits to the image processing apparatus 100 a colorimetric value (i.e., a spectral reflectance) thereof. According to the present exemplary embodiment, the colorimeter 109 is used for determining the color gamut in the color space that the output device 108 is able to output. The details thereof will be described below. The colorimeter 109 may be included in, detachably-attached to, or separately disposed from the output device 108.

Figure 2:
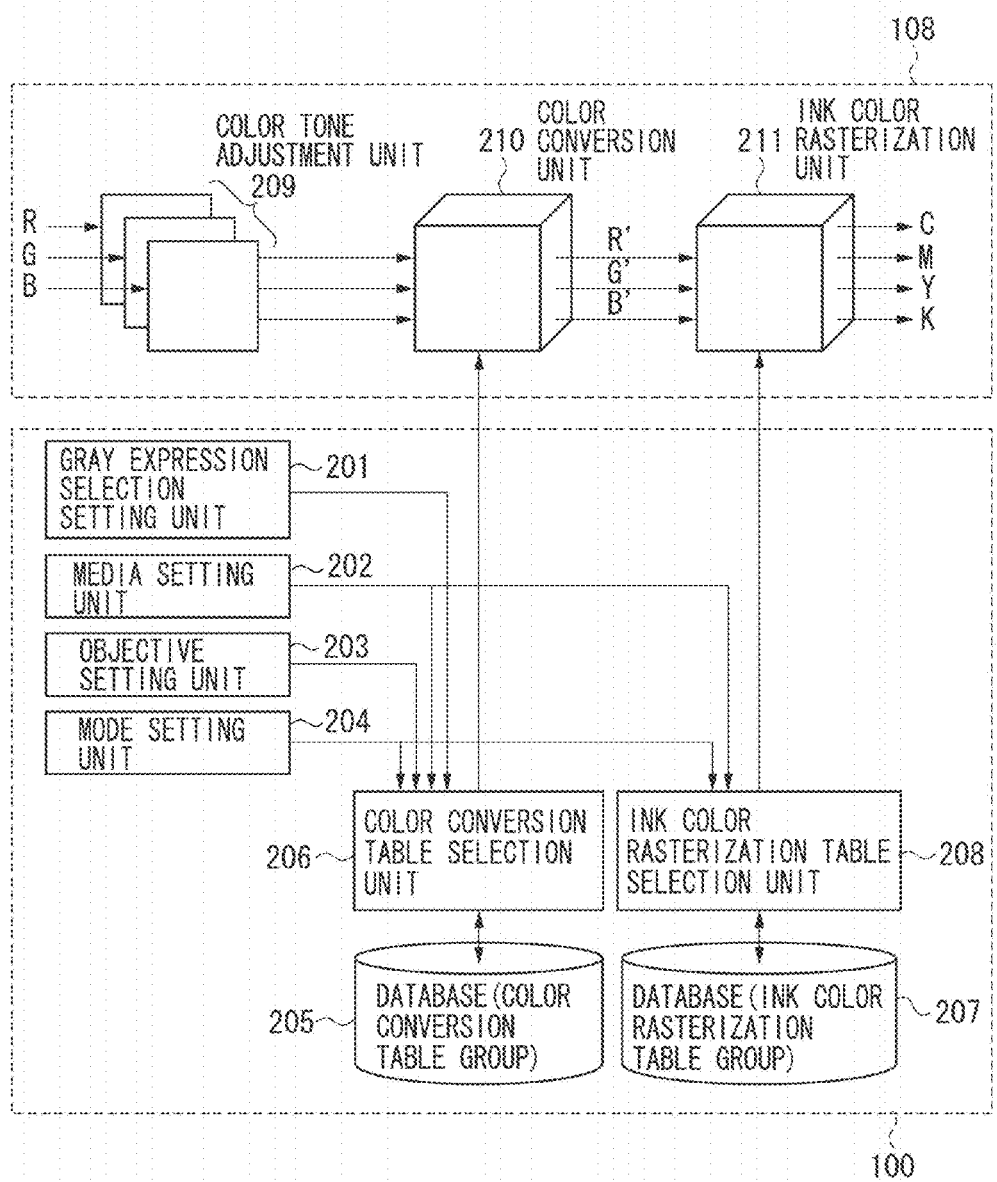
FIG. 2 illustrates each block which performs image processing.

FIG. 2 illustrates each block which performs image processing according to the present exemplary embodiment. Referring to FIG. 2, a gray expression selection setting unit 201, a media setting unit 202, an objective setting unit 203, a mode setting unit 204, a database (DB) (i.e., a color conversion table group) 205, a color conversion table selection unit 206, a DB (i.e., an ink color rasterization table group) 207, and an ink color rasterization table selection unit 208 are realized by a printer driver in the image processing apparatus 100.

The gray expression selection setting unit 201 sets, according to a selection by the user, the color tone in the case where printing is performed in an achromatic color in which R=G=B. The details thereof will be described below. The media setting unit 202 sets a type of the recording medium according to the user selection. For example, the display unit 106 displays, in a pull-down menu, glossy paper, coated paper, and plain paper, and upon the user selecting one of the types, the media setting unit 202 sets the type of the recording medium according to the user selection. The objective setting unit 203 sets a print objective of the image data according to the user selection, similarly as the media setting unit 202. For example, the objective setting unit 203 sets, according to the user selection, a usage such as a portrait photograph, a landscape photograph, and a monochrome photograph, and an objective such as minimizing a color difference or prioritizing brightness. The recording mode setting unit 204 sets, as a recording mode when performing image processing, the mode in which image quality or recording speed is prioritized, according to the user selection similarly as the media setting unit 202. If the output device 108 is realized as the inkjet recording device, the number of passes in multi-pass recording, a carriage speed of a recording head, and recording resolution are controlled according to the above-described mode setting.

The DB 205 is constructed in the external storing device 103, and stores a plurality of color conversion table groups according to a combination of the gray expression, the type of the recording medium, the print objective, and the recording mode. The DB 205 may store the color conversion tables generated in the image processing apparatus 100 according to the user instruction, or previously generated outside the image processing apparatus 100. The color conversion table selection unit 206 selects from the DB 205 the color conversion table corresponding to the gray expression, the type of the recording medium, the print objective, and the recording mode selected by the user. The color conversion table selection unit 206 then converts to and transmits to a color conversion processing unit 210, parameters for performing color conversion.

The DB 207 is constructed in the external storing unit 103, and stores a plurality of ink color rasterization table groups according to the combination of the type of the recording medium and the recording mode. The ink color rasterization table is used for rasterizing, in the case where the output device 108 is to record as an image using cyan (C), magenta (M), yellow (Y), and black (K) inks, RGB image data into CMYK image data corresponding to the four color inks. The ink color rasterization table selection unit 208 selects from the DB 207 the ink color rasterization table corresponding to the recording medium type and the recording mode selected by the user. The ink color rasterization table selection unit 208 then converts the selected table into the parameters for performing ink color rasterization process, and transmits the parameters to an ink color rasterization unit 211.

A color tone adjustment unit 209 uses a one-dimensional look-up table (1D-LUT) and performs color tone adjustment with respect to each of the R, G, and B values in the RGB image data. The color tone adjustment parameters are determined on the setting screen (i.e., a slide bar illustrated in FIG. 4 to be described below) of the printer driver installed in the image processing apparatus 100.

The color conversion unit 210 performs color conversion using a three-dimensional LUT (3D-LUT). If the RGB image data is expressed by R, G, and B in 8-bit each, the 3D-LUT defines 16 grid points for each of R, G, and B. Further, coordinates between the grid points are calculated by an internal interpolation process employing each grid point, such as a tetrahedral interpolation. The color conversion unit 210 performs color conversion on the RGB image data input thereto, according to the gray expression, the type of the recording medium, the print objective, and the recording mode selected by the user. The RGB image data is thus converted into R'G'B' image data, which are device RGB values (hereinafter referred to as R'G'B') unique to the output device 108.

The ink color rasterization unit 211 performs ink color rasterization using the 3D-LUT. For example, the 3D-LUT defines 16 grid points for each of R, G, and B. Further, the coordinates between the grid points are calculated by the internal interpolation process employing each grid point, such as the tetrahedral interpolation. The R'G'B' image data converted by the color conversion unit 210 is thus converted into CMYK image data (i.e., a multi-value for each pixel) by performing ink color rasterization according to the recording medium type and the recording mode selected by the user.

If the output device 108 is realized as the inkjet recording device, the CMYK image data obtained by performing ink color rasterization is rasterized into a binary value for each pixel, and converted into ink discharge data indicating on/off of ink. The inkjet recording device controls the recording head based on the ink discharge data and prints on the recording medium. Printing may be performed by adding light inks of cyan and magenta, R, G, and B inks, and gray ink to the C, M, Y, and K inks as the ink colors. In such a case, the processes performed subsequent to the ink color rasterization process change according to the inks to be used.

Figure 3:
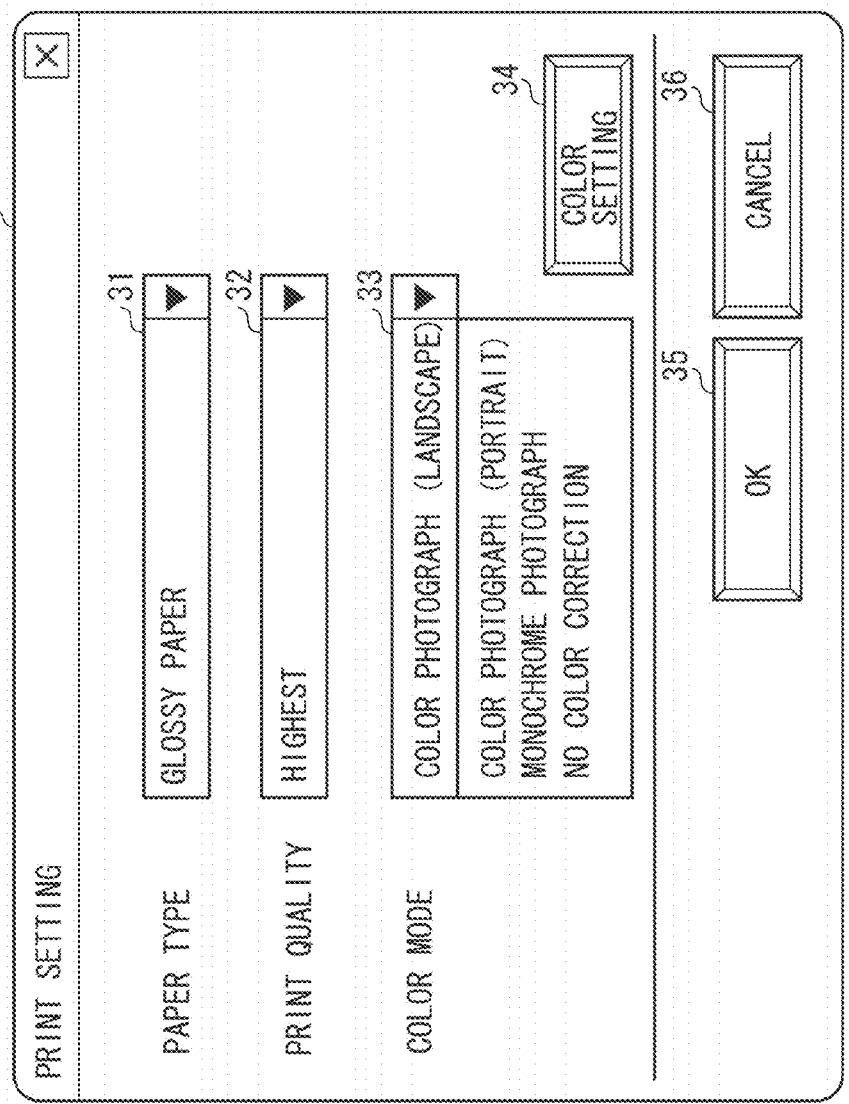
FIG. 3 illustrates a setting screen for a user to specify print settings.

FIG. 3 illustrates an example of a setting screen 30 for the user to specify the print settings. Referring to FIG. 3, the setting screen 30 is displayed on the display unit 106 in the image processing apparatus 100. A field 31 receives the user selection on the type of the recording medium. The field 31 is a pull-down menu, and displays "glossy paper/plain paper/matte paper" to be selectable. The media setting unit 202 acquires a selection result of the user received in the field 31. A field 32 receives the user selection on print quality. The field 32 is a pull-down menu, and displays "highest/fair/high-speed" to be selectable. If the user is to prioritize the image quality in printing, the user selects "highest". If the user is to prioritize the print speed, the user selects "high-speed". The recording mode setting unit 204 illustrated in FIG. 2 then acquires the selection result of the user received in the field 32. A field 33 is a pull-down menu, and displays "color photograph (landscape)/color photograph (portrait)/monochrome photograph/no color correction" to be selectable. The objective setting unit 203 then acquires the selection result of the user received in the field 33.

Figure 5:
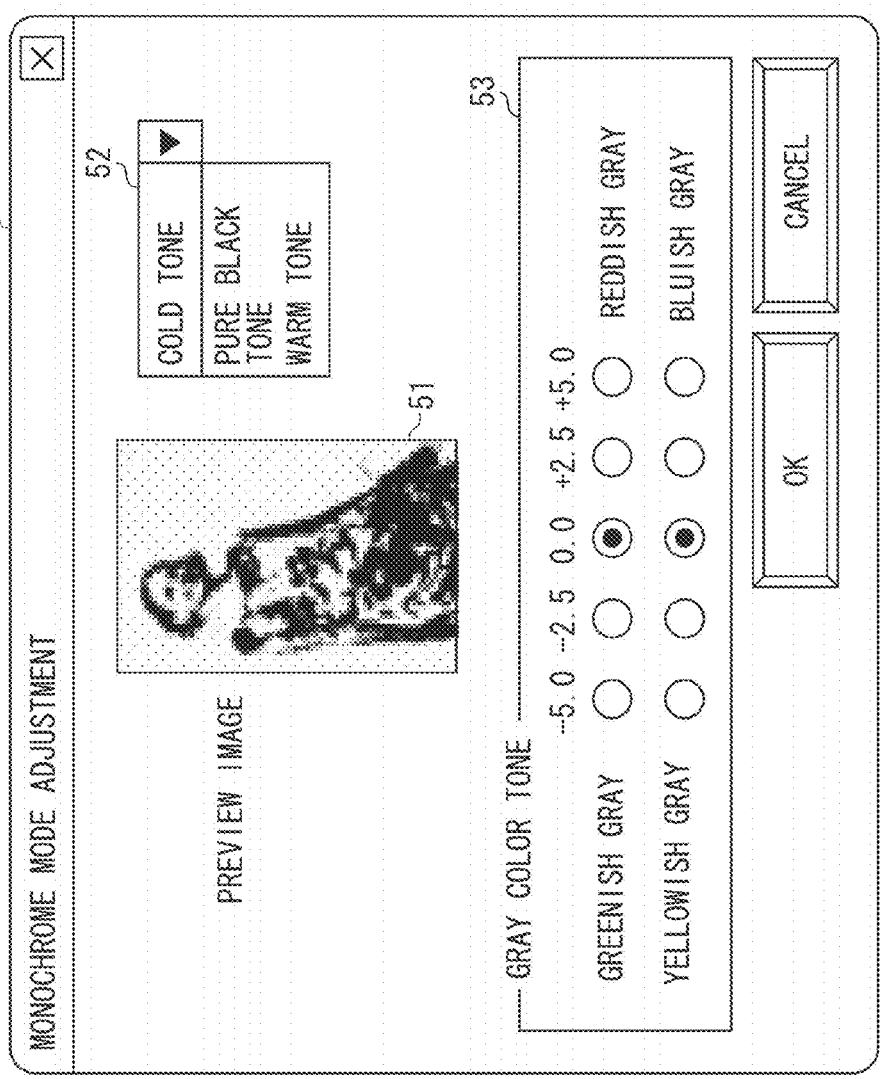
FIG. 5 illustrates a color tone adjustment screen in the case of a monochrome mode.

If the user has selected a color mode other than "no color correction" and presses a color setting button 34, the color tone adjustment screen for the user to select the gray expression is displayed. In contrast, if the user has selected "no color correction", the color setting button 34 cannot be pressed. The user can set on the color tone adjustment screen the gray line expressing the achromatic color in the color space. If the user selects "color photograph" in the field 33 illustrated in FIG. 3, a color tone adjustment screen 40 illustrated in FIG. 40 is displayed. If the user selects "monochrome photograph" in the field 33, a color tone adjustment screen 50 illustrated in FIG. 5 is displayed.

Figure 4:
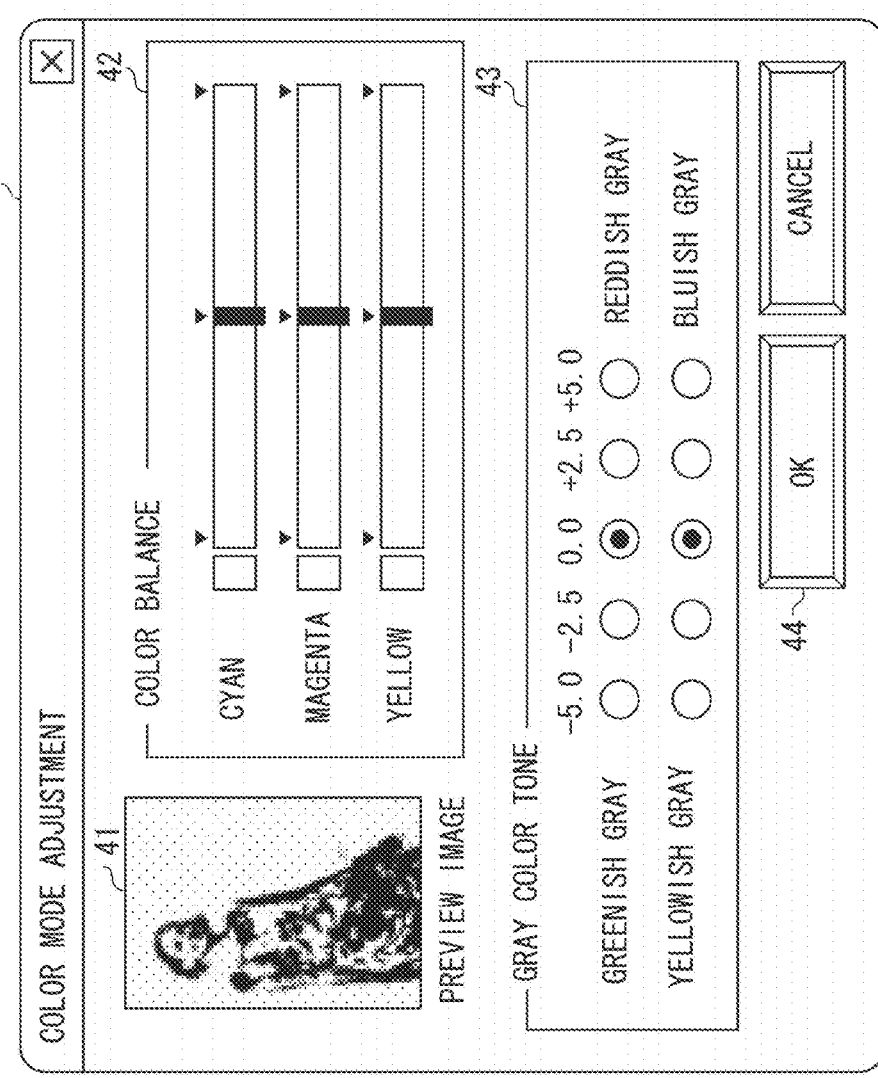
FIG. 4 illustrates a color tone adjustment screen in the case of a color mode.

It is assumed that if the user presses the color setting button 34 illustrated in FIG. 3, and the color tone adjustment screen 40 illustrated in FIG. 4 is initially displayed, a gray chromaticity point corresponding to the content set on the setting screen illustrated in FIG. 3 is set as a reference gray chromaticity point. Referring to FIG. 4, the user can confirm on a preview screen 41 the image according to the currently set color tone. Color balance slide bars 42 are for the user to adjust the color tone of the entire color. According to the present exemplary embodiment, the user can adjust each of the cyan, magenta, and yellow colors using the slide bars. FIG. 4 illustrates a state in which adjustment has not been performed for each color. If the user shifts the cyan slide bar in the right direction, red becomes strong in the entire image, and if the user shifts the slide bar in the left direction, cyan becomes strong. Further, if the user shifts the magenta slide bar in the right direction, green becomes strong in the entire image, and if the user shifts the slide bar in the left direction, magenta becomes strong. Furthermore, if the user shifts the yellow slide bar in the right direction, blue becomes strong in the entire image, and if the user shifts the slide bar in the left direction, yellow becomes strong. The color tone adjustment unit 209 illustrated in FIG. 2 refers to the 1D-LUT based on the values of the slide bars illustrated in FIG. 4, and performs color tone adjustment with respect to the input RGB image data.

The user can select in a field 43 the gray chromaticity point (i.e., the reference gray chromaticity point). The field 43 includes buttons for setting the gray chromaticity point between a greenish gray and a reddish gray, and buttons for setting the gray chromaticity point between a yellowish gray and a bluish gray. As illustrated in FIG. 4, according to the present exemplary embodiment, the gray chromaticity point between the greenish gray and the reddish gray and the gray chromaticity point between the yellowish gray and the bluish gray can be respectively adjusted from 5 types set at 2.5 intervals. In other words, the user can select, on the color tone adjustment screen 40, the gray chromaticity point from 5×5=25 types. Further, the DB 205 illustrated in FIG. 2 stores 25 tables according to the 25 patterns of the gray chromaticity point. The DB 205 may also store several among the 25 types instead of the 25 tables, and the table can be appropriately corrected and used by performing interpolation. If the user then presses an OK button 44, the content set on the color tone adjustment screen 40 is set.

Figure 6:
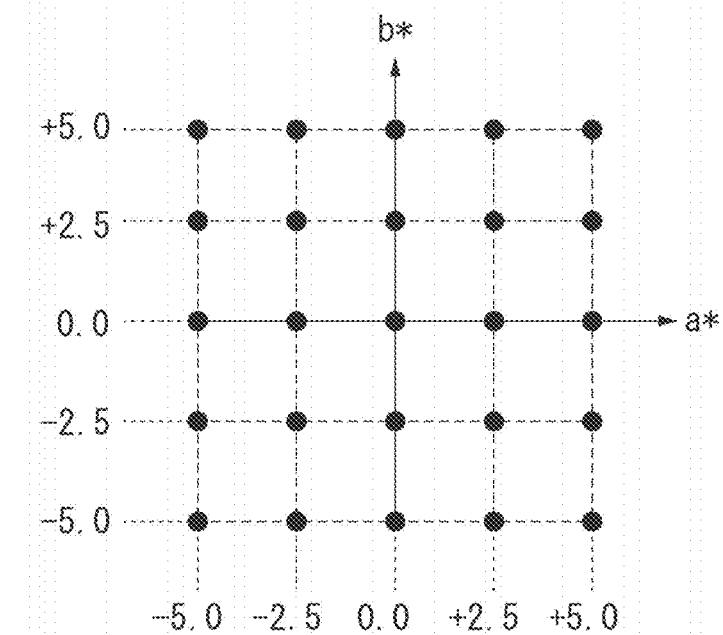
FIG. 6 illustrates selectable gray chromaticity points associated with each other in the color space.

FIG. 6 illustrates the gray chromaticity points selectable by the user, associated with each other in the color space. Referring to FIG. 6, when the user adjusts the slide bar between the greenish and the reddish chromaticity points, the gray chromaticity point changes in an a* axis direction on an a*b* coordinate system, which is an isochromatic color space illustrated in FIG. 6. Further, when the user adjusts the slide bar between the yellowish and the bluish chromaticity points, the gray chromaticity changes in a b* axis direction. In other words, if the user selects the gray chromaticity point from the 25 types, one of the gray chromaticity points among the 25 points illustrated in FIG. 6 is specified. The DB 205 illustrated in FIG. 2 stores the color conversion tables in which each of the 25 points is the gray line. More specifically, the gray expression selection setting unit 201 illustrated in FIG. 2 acquires the gray chromaticity point selected on the color tone adjustment screen 40, and transmits to the color conversion table selection unit 206 the information on the acquired gray chromaticity point.

As described above, if the user has selected "monochrome photograph" in the field 33 illustrated in FIG. 3, the color tone adjustment screen 50 illustrated in FIG. 5 is displayed. It is assumed that if the user presses the color setting button 34 illustrated in FIG. 3, and the color tone adjustment screen 50 illustrated in FIG. 5 is initially displayed, the gray chromaticity point corresponding to the content set on the setting screen illustrated in FIG. 3 is set as the gray reference chromaticity point. The gray reference chromaticity point corresponding to each of a gray color tone such as a cold tone (i.e., bluish monochrome), a pure black tone (i.e., a pure monochrome), and a warm tone (i.e., a sepia-tone monochrome) is set. If the user switches in a field 52 to one of the cold tone, the pure black tone, or the warm tone, a default gray reference chromaticity point corresponding to each color tone is set. The gray expression selection setting unit 201 illustrated in FIG. 2 acquires the content selected in the field 52 and the gray chromaticity point. Further, the DB 205 stores the 25 types of tables corresponding to the combinations of the selectable chromaticity points. However, the DB 205 may store, instead of the 25 tables, the tables which become a basis for each gray color tone, and the content of the tables may be appropriately corrected according to the gray reference chromaticity point determined by a user designation. For example, if the user has selected the "cold tone", (a*, b*)=(+2.5, −2.5) illustrated in FIG. 6 is determined as the gray chromaticity point. Further, if the user has selected the "pure black tone", (a*, b*)=(0.0, 0.0) illustrated in FIG. 6 is determined as the gray chromaticity point. Furthermore, if the user has selected the "warm tone", (a*, b*)=(+2.5, +2.5) illustrated in FIG. 6 is determined as the gray chromaticity point. In other words, the cold tone and the warm tone are gray which has some color tone. Further, the user can arbitrarily select the gray chromaticity point from the 25 types regardless of the field 52. Furthermore, the user can also confirm on the preview screen 51 illustrated in FIG. 5 the image corresponding to the currently set color tone. Adjustment of the gray color tones illustrated in FIGS. 4 and 5 is not limited to adjusting a* and b* at 0.5 intervals. The interval may be decreased or increased. Moreover, the user may select arbitrary values of a* and b* using the slide bar. Further, the user interface (UI) is not limited to that illustrated in FIGS. 4 and 5. A two-dimensional coordinate system may be displayed, and the user may designate on the coordinates an arbitrary point. Furthermore, the user may input the values of a* and b*.

As described above, the user specifies the various settings on the screens illustrated in FIGS. 3, 4, and 5. As a result, the user can select, from the plurality of color conversion tables, the color conversion table for acquiring the desired output image according to the settings. Further, according to the present exemplary embodiment, the gray line in the color conversion table selectable by the user is generated to prevent a drastic change in the color tone in the low lightness area.

Figure 7:
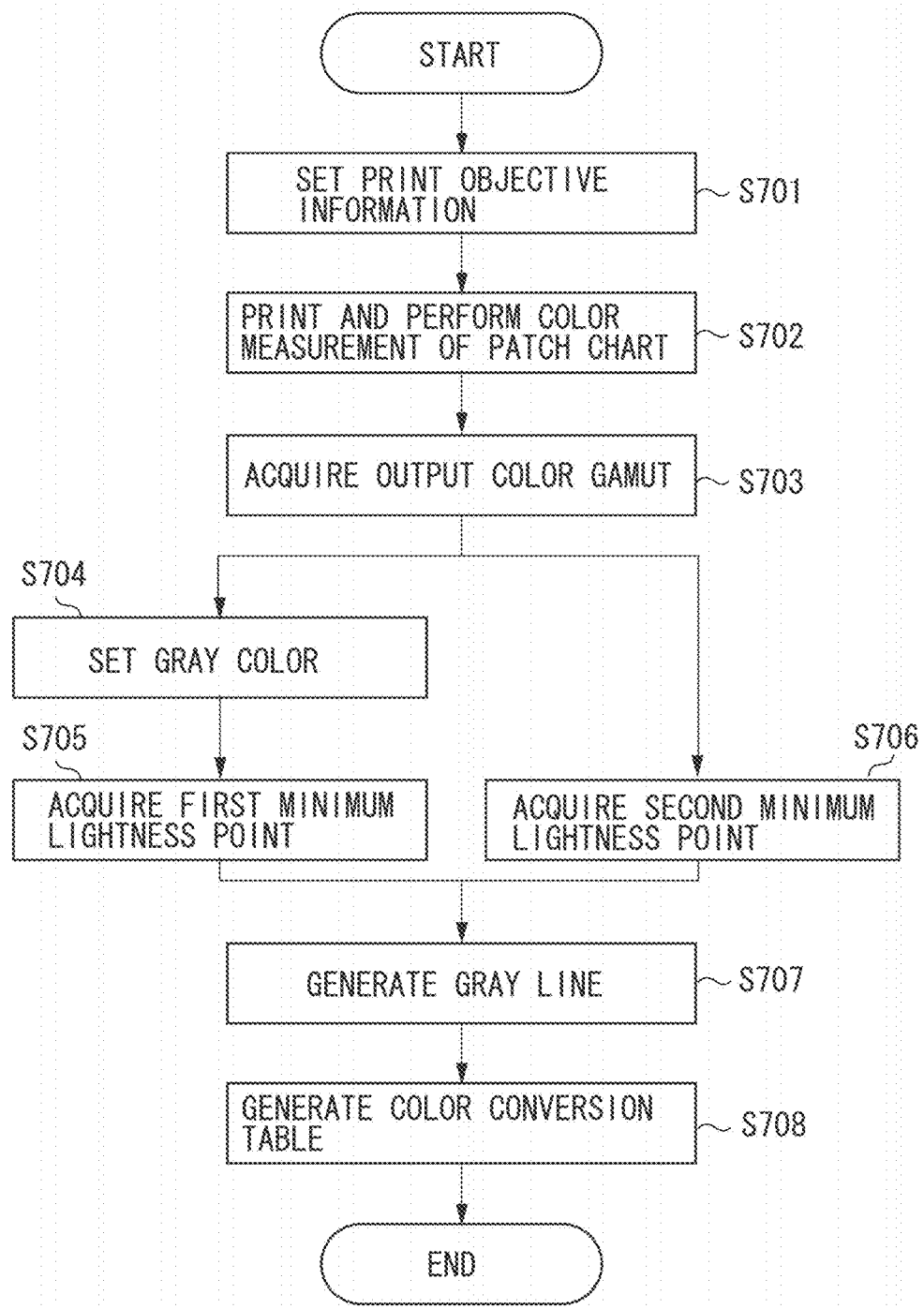
FIG. 7 is a flowchart illustrating a color conversion table generation process.

FIG. 7 is a flowchart illustrating the color conversion table generation process according to the present exemplary embodiment. The CPU 101 in the image processing apparatus 100 realizes each of the processes illustrated in FIG. 7. In step S701, the CPU 101 acquires the setting content specified on the setting screen illustrated in FIG. 3. The CPU 101 acquires the setting content as selection information to be transmitted from the media setting unit 202, the objective setting unit 203, and the recording mode setting unit 204 to the color conversion table selection unit 206 and the ink color rasterization table selection unit 208.

Figure 8:
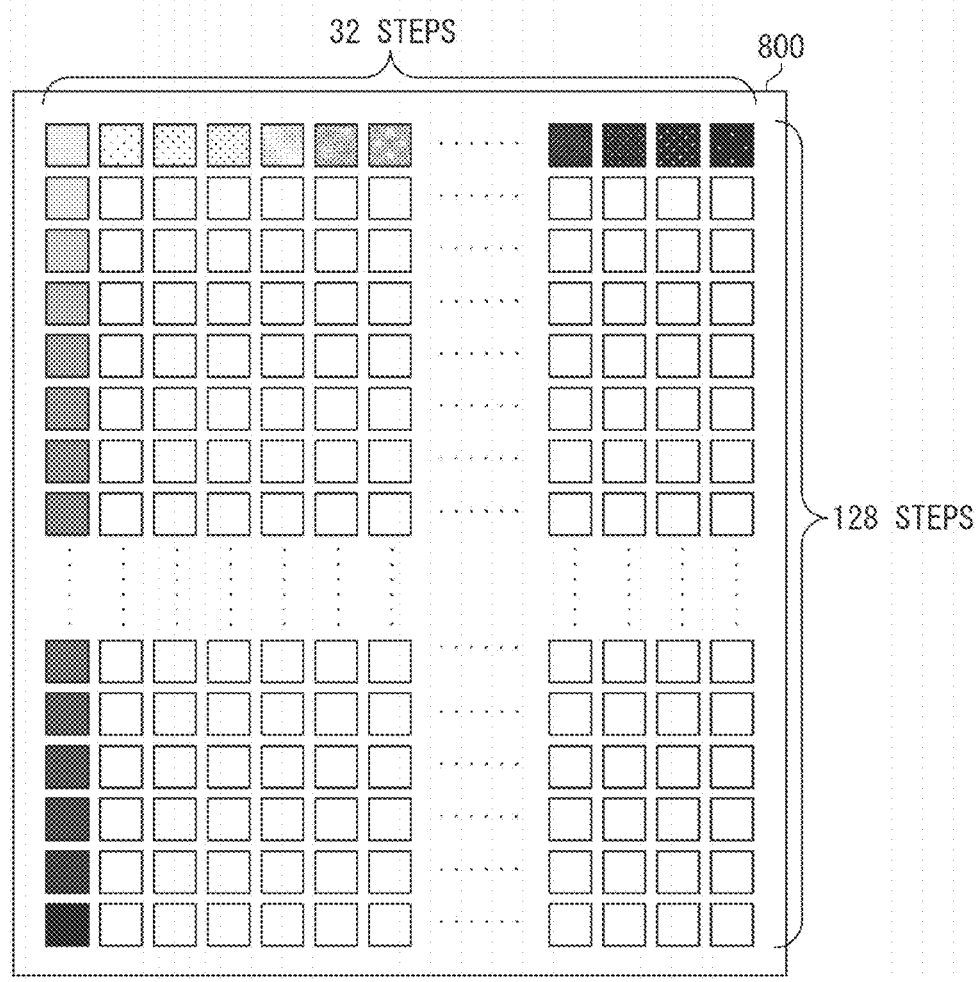
FIG. 8 illustrates an example of a patch chart.

In step S702, the CPU 101 reads patch data previously stored in the external storing unit 103, and causes the output device 108 via the printer driver to print the patch chart including a plurality of patches. FIG. 8 illustrates an example of the patch chart. Referring to FIG. 8, a patch chart 800 printed in step S702 includes a plurality of patches obtained by dividing, into 16 steps, each of R, G, and B axes in the RGB color space. In other words, 16×16×16=4096 patches are printed in the patch chart 800.

The CPU 101 performs the process of step S702 to determine the color gamut printable by the output device 108. As a result, when the CPU 101 performs the process of step S702, the user selects "no color correction" in the field 33 illustrated in FIG. 3. Further, when the patch data is to be printed, the color conversion unit 210 has not yet performed color conversion.

In step S703, the CPU 101 activates the application for performing color measurement of the patches, and controls the colorimeter 109 to perform color measurement of the patches in the printed patch chart 800. The colorimetric value of each patch is stored in the external storing unit 103 via the I/F 105. The CPU 101 then activates a color conversion table generation application, and detects, on a uniform color space such as a Commission Internationale de l'Eclairage (CIE) L*a*b* color space and a JCh color space (lightness, Chroma, hue), the color gamut printable by the output device 108. The CPU 101 detects the color gamut based on the colorimetric value of each patch stored in the external storing unit 103.

Figure 9:
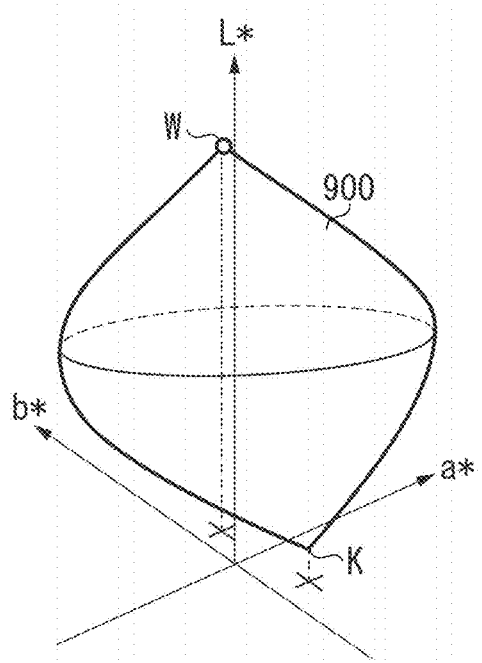
FIG. 9 illustrates on the color space a result of the color gamut that an output device is able to output.

FIG. 9 illustrates, in the CIE L*a*b* color space, the result of detecting the color gamut printable by the output device 108 based on the colorimetric value of each patch. Referring to FIG. 9, a color gamut 900 indicates the color gamut printable by the output device 108. A point W (i.e., the white point) is a point indicating the maximum lightness (i.e., a brightest portion) on the color gamut 900. In other words, the point W indicates the colorimetric value of the patch corresponding to white (i.e., paper white) in the patch chart 800. Further, a point K (i.e., the black point) is a point indicating a minimum lightness (i.e., a darkest portion) in the color gamut 900. Both point W and point K on the color gamut 900 are not the achromatic color in which a*=b*=0, and are chromatic. If the color gamut reproducible by the output device 108 is known, printing and performing color measurement of the patch chart may be omitted. In such a case, the CPU 101 acquires in step S703 the information on an output color gamut stored in a memory.

In step S704, the CPU 101 acquires the gray chromaticity point selected by the user on the color tone adjustment screen 40 illustrated in FIG. 4 or the color tone adjustment screen 50 in FIG. 5. The CPU 101 acquires the gray chromaticity point as the selection information to be transmitted from the gray expression selection setting unit 201 to the color conversion table selection unit 206. According to the present exemplary embodiment, the gray chromaticity point selected by the user is a point G. In step S705, the CPU 101 acquires the first minimum lightness point in the color gamut 900.

Figure 10:
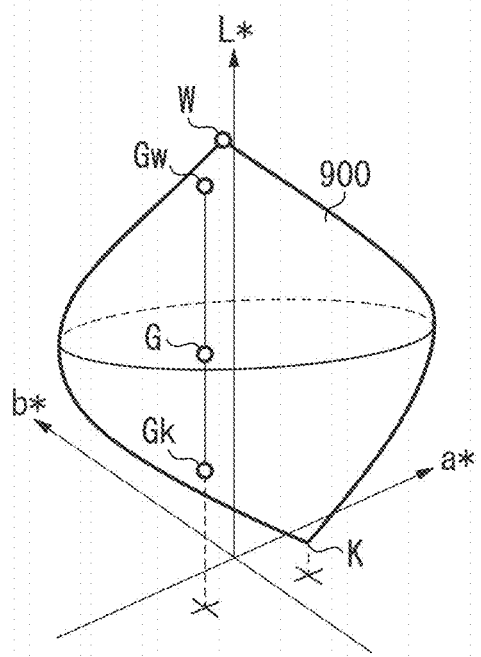
FIG. 10 illustrates a first minimum lightness point.

FIG. 10 illustrates the first minimum lightness point (i.e., a first lightness point). Referring to FIG. 10, a point on a high lightness side, among intersections of the color gamut 900 and a line passing through the point G and extending in the L* axis (i.e., on the lightness axis) direction, is specified as a point Gw, and a point on a low lightness side among the intersections is specified as a point Gk. The first minimum lightness point is thus the point Gk. As illustrated in FIG. 10, the a*b* coordinates of the point Gk become the same as those of the point G (i.e., having the same hue).

Figure 11:
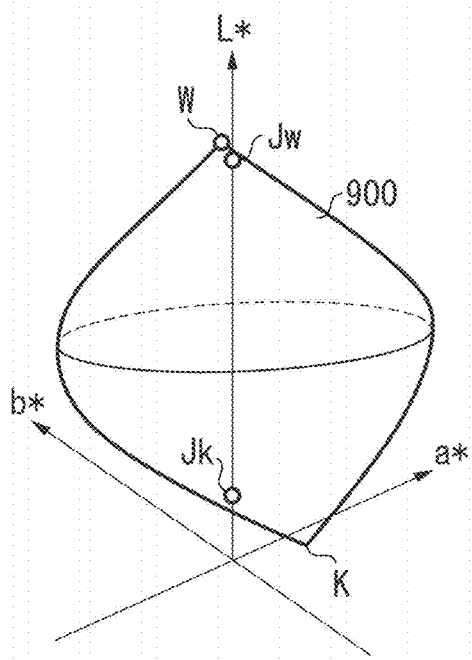
FIG. 11 illustrates a second minimum lightness point.

In step S706, the CPU 101 specifies on the color gamut 900 the second minimum lightness point, at the same time as performing the processes of step S704 and step S705. FIG. 11 illustrates the second minimum lightness point (i.e., the second lightness point). Referring to FIG. 11, there are two intersections, i.e., a point Jw and a point Jk, of the color gamut 900 and the L* axis (i.e., the achromatic colors), which are achromatic. The point Jw is the intersection of larger lightness, and the point Jk is the intersection of smaller lightness. The second minimum lightness point is thus the point Jk. As illustrated in FIG. 11, the a*b* value of the point Jk is "0". In the flowchart illustrated in FIG. 7, step S705 and step S706 are parallel-processed. However, the process of step S706 may be performed after step S705.

Figure 12A:
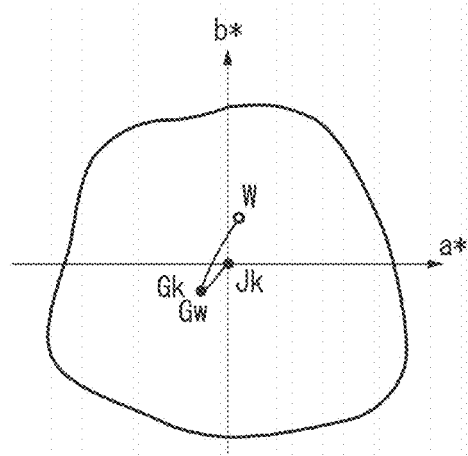
FIGS. 12A and 12B illustrate the procedures for obtaining a point Js.
Figure 12B:
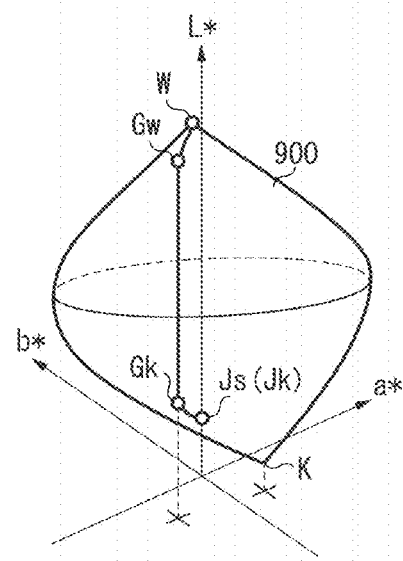

In step S707, the CPU 101 sets the gray line according to the present exemplary embodiment using the point Gk, i.e., the first minimum lightness point, and the point Jk, i.e., the second minimum lightness point. More specifically, the CPU 101 obtains the point Js which becomes the minimum lightness point on the line connecting the point Gk and the point Jk on an outermost shell on the color gamut 900. FIGS. 12A and 12B illustrate the procedures for obtaining the point Js. Referring to FIGS. 12A and 12B, the point Js is obtained as the same point as the point Jk. However, the point Js may be obtained at a position in the middle of the point Gk and the point Jk on the line connecting the point Gk and the point Jk, depending on the gray reference chromaticity point and the shape of the outermost shell of the color gamut 900.

According to the present exemplary embodiment, the gray line sets, as the black point, the point Js having the minimum lightness on the gray line and in which the hue is not greatly different from that of the gray reference chromaticity point, as illustrated in FIG. 12B. The gray line then extends along the line on the outer most shell of the color gamut 900 printable by the output device 108 and passes through the point Gk, and changes so that the lightness linearly increases to the point Gw. The gray line runs along the outermost shell of the color gamut 900 and reaches the point W of the maximum lightness (i.e., paper white). In other words, when reproducing the achromatic color in which R=G=B in the input RGB image data, the L*a*b* value of the point Js is reproduced when R=G=B=0, and the L*a*b* value corresponding to the above-described gray line is reproduced as the lightness increases. Further, if the R, G, and B colors, each of which is 8-bit data, is to be processed, the L*a*b* value of the point W is reproduced when R=G=B=255. If R, G, and B are other values, the point is reproduced according to the L*a*b* value on the generated gray line. According to the present exemplary embodiment, the white point W is set as the base color (i.e., paper white) of the recording medium. However, another value may be set as the white point W.

Figure 13A:
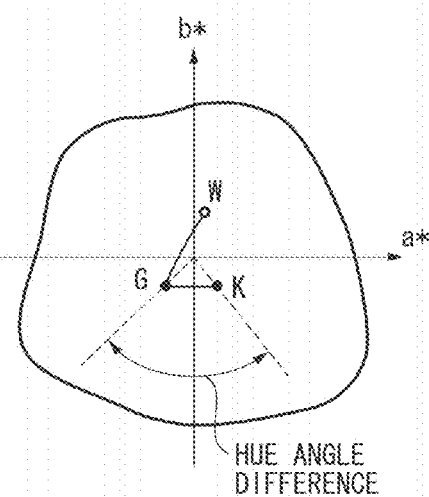
FIGS. 13A and 13B illustrate a gray line in the case where the minimum lightness point in the color gamut is set as the black point.
Figure 13B:
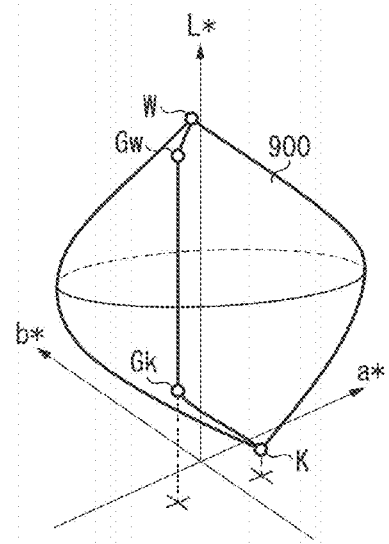

FIGS. 13A and 13B illustrate the gray line in which the lowest lightness of the color gamut printable by the output device 108 is set as the black point without using the method according to the present exemplary embodiment. In such a case, as illustrated in FIG. 13B, the gray line starts from the point K of minimum lightness in the color gamut 900, extends along the line on the outermost shell of the color gamut 900 and passes through the point Gk, and changes so that the lightness linearly increases to the point Gw. The gray line then runs along the outermost shell of the color gamut 900 and reaches the point W of the maximum lightness (i.e., paper white). In other words, when reproducing the achromatic color in which R=G=B in the RGB image data, the L*a*b* value of point K is reproduced when R=G=B=0. As the lightness then increases, the L*a*b* value corresponding to the above-described gray line is reproduced. Further, if the R, G, and B colors, each of which is 8-bit data, is to be processed, the L*a*b* value of point W is reproduced when R=G=B=255.

In other words, according to this example, as illustrated in FIG. 13A, the difference between the hue angles of the gray chromaticity point and the point K is large in the low lightness area of the gray line. Such a state indicates that the gray line leaps across the hue along the way and changes to the warm tone in the low lightness area, even when the user has set the gray line in the cold tone, i.e., a phenomenon referred as "color transition" has occurred. Such a phenomenon provides a feeling of strangeness to the viewer and deteriorates the image quality.

However, according the present exemplary embodiment, as illustrated in FIG. 12A, the black point is at the position in which the hue angle is not greatly different from that of the gray reference chromaticity point selected by the user. The hue thus does not greatly change in the low lightness area of the gray line. In other words, the above-described phenomenon can be prevented, and the image quality is prevented from becoming deteriorated when the user designates the desired gray chromaticity point (i.e., color tone) and reproduces the gray image.

In step S708, the CPU 101 generates the color conversion table based on the gray line set in step S707. The generated color conversion table becomes the color conversion table corresponding to the chromaticity point selectable by the user illustrated in FIGS. 4, 5, and 6. More specifically, the CPU 101 generates the color conversion table by obtaining the parameters of each of the grid points of R', G', and B' in the 3D-LUT used in color conversion performed by the color conversion unit 210.

Figure 14:
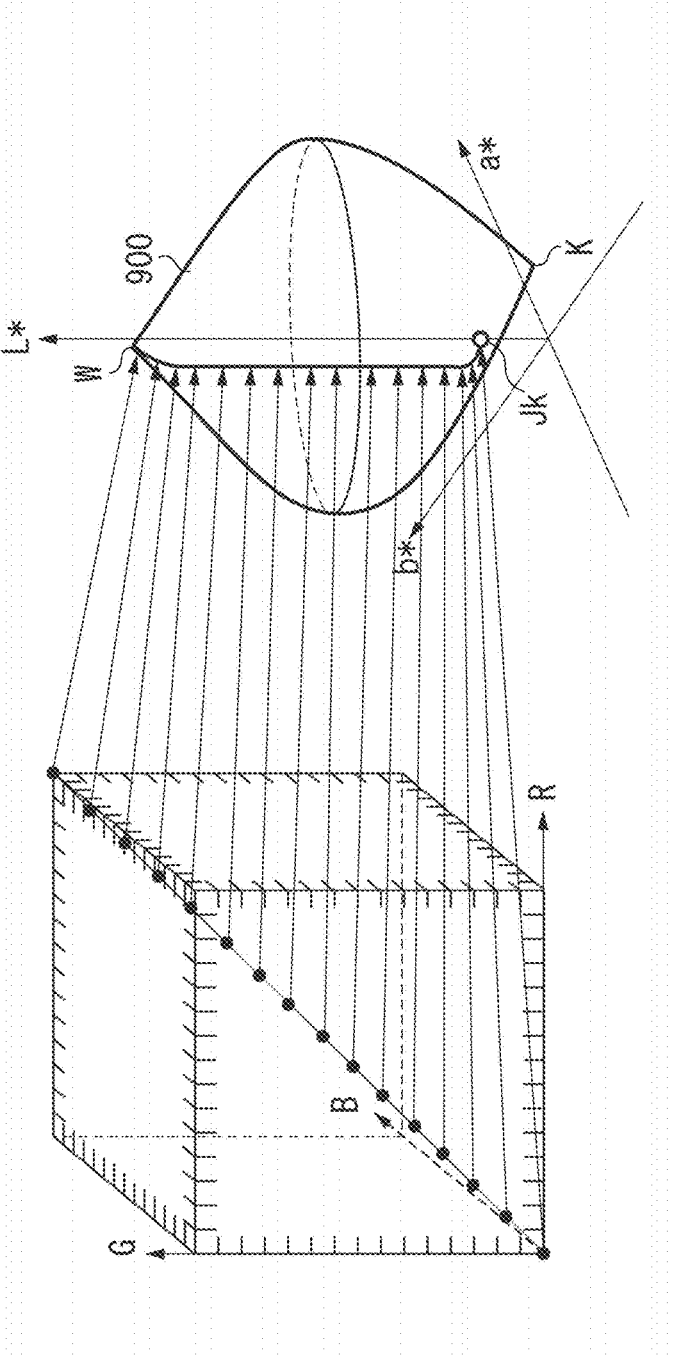
FIG. 14 illustrates the procedures for obtaining parameters of each of grid points of red (R), green (G), and blue (B).

FIG. 14 illustrates the procedures for obtaining the parameters of each of the grid points of R', G', and B'. Referring to FIG. 14, the coordinates in the RGB color space corresponding to the L*a*b* values along the gray line set in step S707 are each of the grid points of R', G', and B' (i.e., achromatic color). According to the preset exemplary embodiment, a correspondence relation between the L*a*b* values and the RGB values for performing mutual conversion is determined as appropriate according to the color gamut of the input RGB image data.

After the parameter of each of the grid points of R', G', and B' on the gray line is determined in step S708, the CPU 101 determines the parameter of each of the grid points corresponding to the chromatic colors other than the gray line. The CPU 101 determines the parameter according to the type of the recording medium and the print objective (i.e., the color mode included in the print setting) selected by the user. Gamma characteristics of the color photograph (portrait), the color photograph (landscape), and the monochrome photograph among the print objectives are different in printing, and the parameter of each of the grid points of R', G', and B' is thus determined according to the print objective specified in the print setting. However, the gray line set in step S707 is used in all of the print objectives. When the parameter of each grid point corresponding to the chromatic color is to be obtained based on the gray line, various methods may be used. As described above, the color conversion table can be generated based on the setting of the gray expression, and further according to the media setting, the objective setting, and the recording mode setting designated by the user. A plurality of such color conversion tables is generated as combinations of the different settings. Further, the generated color conversion table corresponds to the above-described gray line. The color conversion table generated as described above is stored in the DB 205, and the user can easily select the color conversion table corresponding to the settings that the user has selected according to the setting screen.

The process for setting the allowable range of the hue angle difference (i.e., the hue difference) between the point G and the point K illustrated in FIG. 13A when setting the gray line will be described below.

Figure 15:
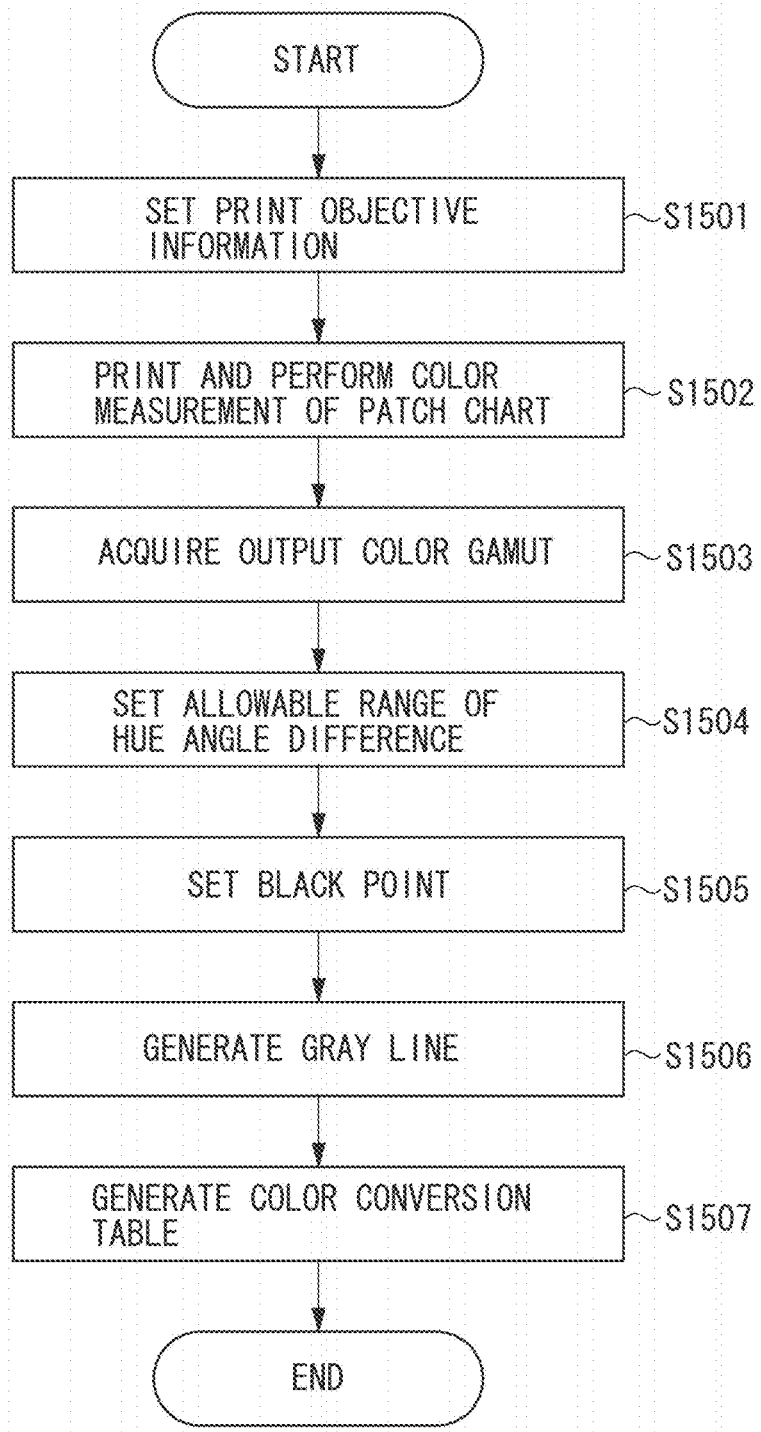
FIG. 15 is a flowchart illustrating the process for setting an allowable range of a difference in the hue angles (i.e., hue angle difference).

FIG. 15 is a flowchart illustrating the process for setting the allowable range (i.e., a reference range) of the hue angle difference according to a second exemplary embodiment of the present invention. The CPU 101 included in the image processing apparatus 100 realizes the processes illustrated in FIG. 15. Step S1501 to step S1503 illustrated in FIG. 15 are similar to step S701 to step S703 illustrated in FIG. 7. Further, step S1506 and step S1507 illustrated in FIG. 15 are similar to step S707 and step S708 illustrated in FIG. 7.

Figure 16:
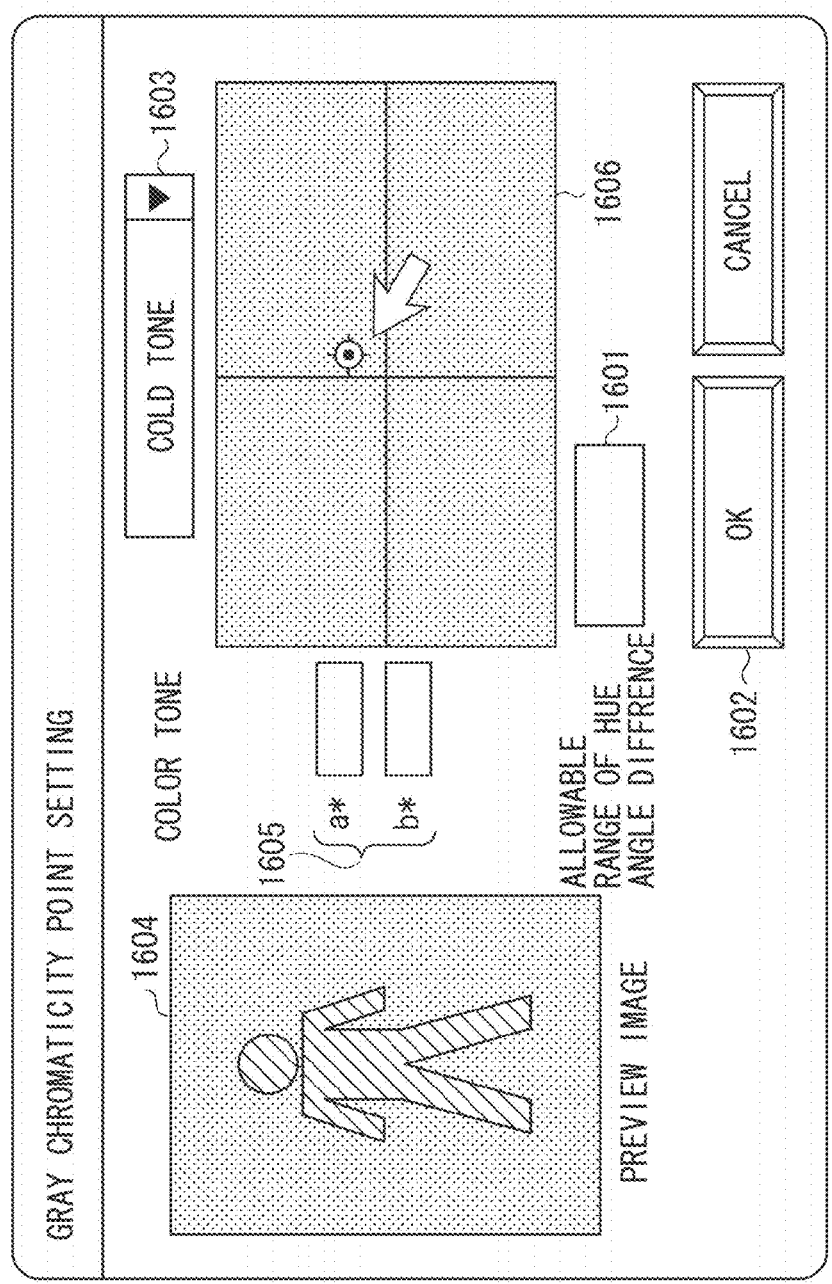
FIG. 16 illustrates a setting screen for setting the allowable range of the hue angle difference.

After performing the process of step S1503, in step S1504, the CPU 101 sets the allowable range of the hue angle difference according to the user instruction. FIG. 16 illustrates an example of the setting screen for the user to set the allowable range of the hue angle difference. Referring to FIG. 16, the setting screen corresponds to the color tone adjustment screen illustrated in FIG. 5. More specifically, a field 1603 corresponds to the field 52, and a preview screen 1604 corresponds to the preview screen 51. Further, a field 1605 receives the setting for the gray chromaticity point similarly as the field 53. The field 1605 indicates a two-dimensional coordinate system for causing the user to designate a*, b*. The user thus designates an arbitrary point on the coordinate system. Furthermore, it is assumed that when the user has pressed the color setting button 34 illustrated in FIG. 3, and the setting screen illustrated in FIG. 16 has been initially displayed, the gray color tone (i.e., the chromaticity point) corresponding to the content set on the setting screen illustrated in FIG. 3 is set as the gray reference chromaticity point. The gray reference chromaticity point corresponding to each of the cold tone, the pure black tone, and the warm tone is set. In other words, if the color tone is switched to one of the cold tone, the pure black tone, and the warm tone, the default gray reference chromaticity point corresponding to each tone is set.

The gray chromaticity point is set in the field 1605 by the user directly inputting the values of a* and b* using the operation unit 104 such as a keyboard, instead of selecting from the combinations of the predetermined coordinate points. A field 1606 displays, on the coordinates in an a*b* plane, the values of a* and b* set in the field 1605 as the current gray chromaticity point. Further, the user may set the gray chromaticity point by moving a pointer in the field 1606 using the operation unit 104 such as a pointing device. The field 1605 and the pointer in the field 1606 are associated with each other. Further, if the user switches among the cold tone, the pure black tone, and the warm tone in the field 1603, the pointer automatically moves to the position corresponding to the default gray reference chromaticity point. The ranges of a* and b* values that can be set in the field 1605 may be limited to the ranges in which the color transition does not greatly occur, e.g., to a predetermined achromatic area (around the gray line) in which a* is between −10 and +10, and b* is between −10 and +10.

The field 1601 illustrated in FIG. 16 receives the user setting on the allowable range of the hue angle difference. For example, the user inputs a value such as "120 degrees" in the field 1601. A value which can define the range of the hue angle difference illustrated in FIG. 13A, such as an angle or a color difference, may be input. If the user then presses an OK button 1602, the content set on the setting screen illustrated in FIG. 16 is fixed. The change in the gray chromaticity point by the user is reflected in the preview screen 1604, and the user can determine the desired chromaticity point while viewing the preview screen 1604.

Figure 17A:
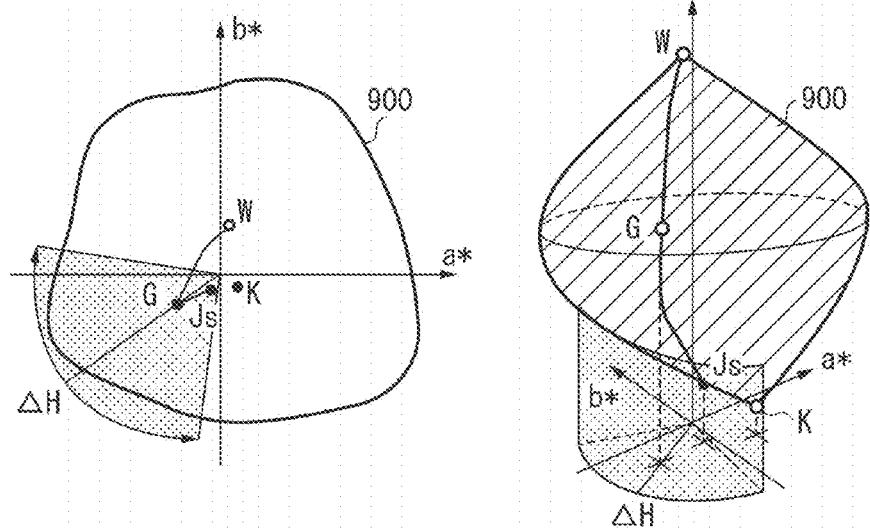
FIGS. 17A and 17B illustrate the allowable range of the hue angle difference.

In step S1505, the CPU 101 specifies the minimum lightness point (i.e., the black point) on the gray line. For example, it is assumed that the point G and the point K set by the user are positioned as illustrated in FIG. 17A. Referring to FIG. 17A, ΔH is the allowable range of the hue angle difference set by the user in the field 1601. In the example illustrated in FIG. 17A, the point Js is specified as the minimum lightness point on the gray line. More specifically, it is determined whether the point Js specified according to the first exemplary embodiment is included in the allowable range ΔH. If it is determined that the point Js is included in the allowable range ΔH, the point Js is directly specified as the minimum lightness point on the gray line. On the other hand, if it is determined that the point Js is not included in the allowable range ΔH, a point on the line of the outermost shell of the color gamut 900 connecting the point Js and the point Gk, and which becomes the minimum lightness point in the allowable range ΔH, is scanned and specified.

Figure 17B:
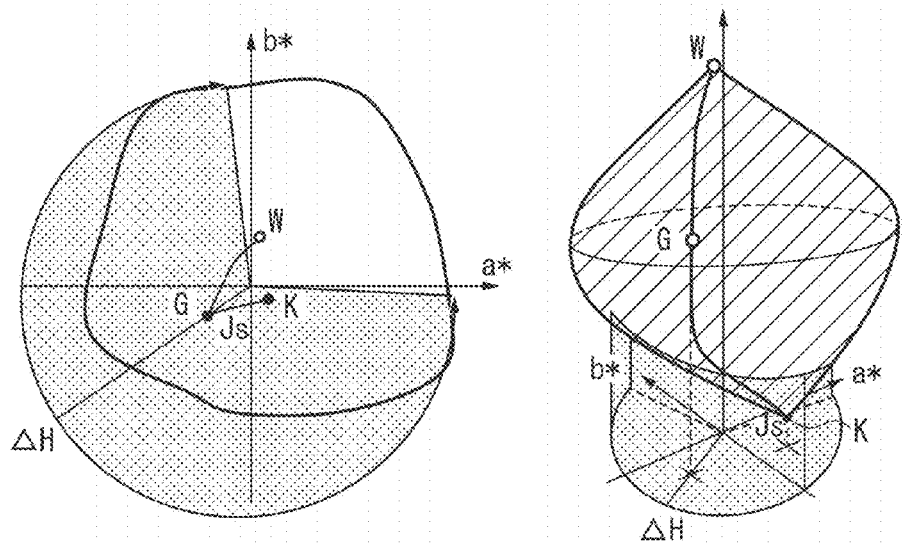

FIG. 17B illustrates the case where the allowable range of the hue angle difference is set in a wider range as compared to FIG. 17A. Referring to FIG. 17B, the point K is included in the allowable range ΔH. As a result, in such a case, the point K is specified as the minimum lightness point on the gray line. Upon determination of the gray line, the color conversion table is then generated based on the determined gray line, similarly as in the first exemplary embodiment.

According to the present exemplary embodiment, if the user is to prioritize density (i.e., an image of higher density is to be output), the user sets a wider allowable range of the hue angle difference. Further, if the user desires to reduce the color transition, the user sets a narrower allowable range of the hue angle difference. As a result, according to the present exemplary embodiment, the gray line reflecting the user preference can be set.

Figure 18:
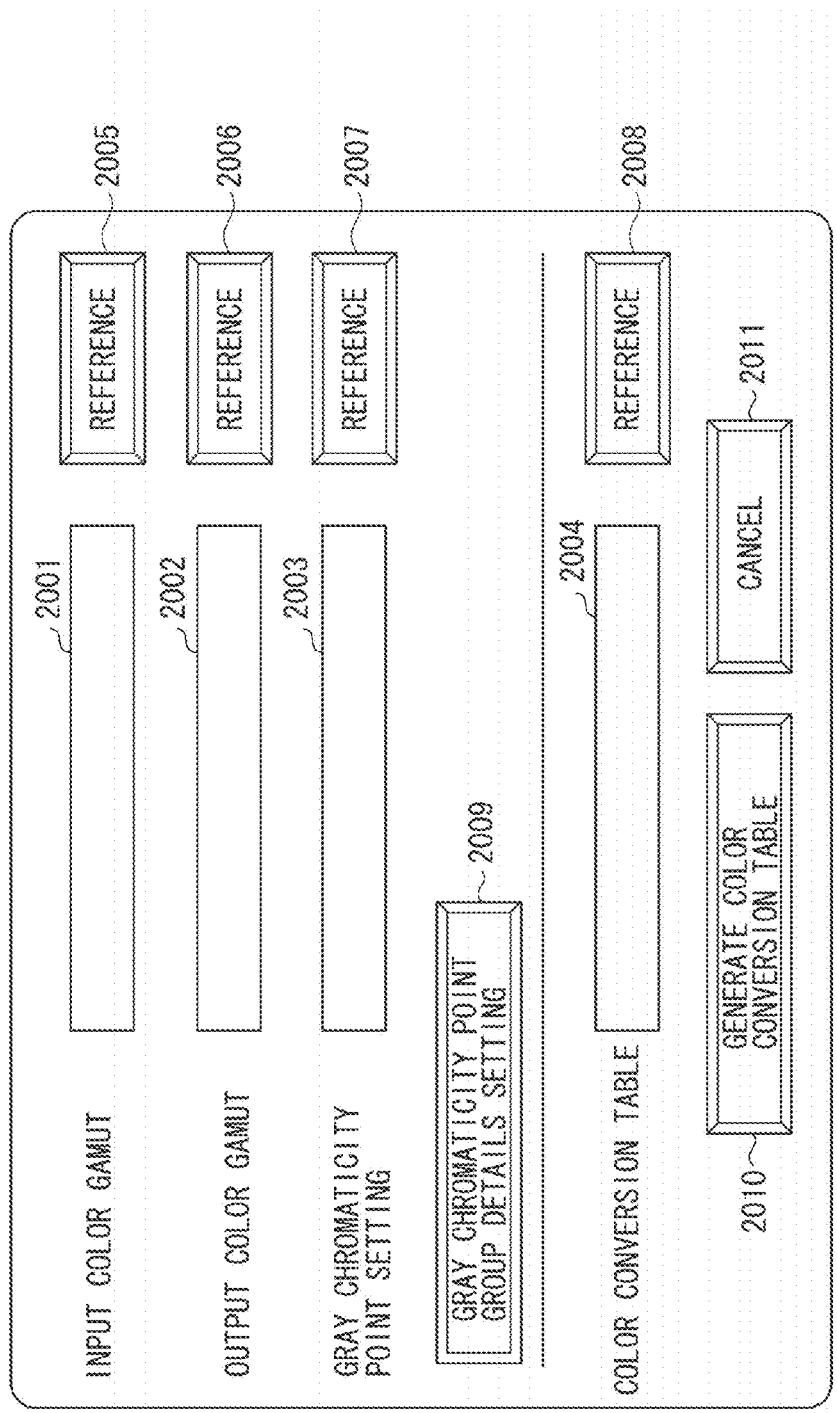
FIG. 18 illustrates a screen for instructing generation of a color conversion table.

FIG. 18 illustrates an example of a data input screen for acquiring from the user instruction the data necessary for generating the color conversion table (as in step S708 illustrated in FIG. 7 and step S1507 illustrated in FIG. 15) according to the first and second exemplary embodiments. Referring to FIG. 18, the user designates, in a field 2001, color space data of the image data to be input (i.e., input color gamut), and designates, in a field 2002, output color space data (i.e., output color gamut). The input color space data includes sRGB and Adobe RGB. The output color gamut acquired in step S702 and step S1503 is set as the output color space data. Further, the user sets in a field 2003 the data defining a target value of the gray chromaticity point on the recording medium. Furthermore, the user designates, in a field 2004, a file name of the color conversion table to be generated. Moreover, the user can select and designate, using reference buttons 2005, 2006, 2007, and 2008, a storing location of the file including the data to be input to each field.

If the user presses a gray chromaticity point details setting button 2009, the screen illustrated in FIG. 4, FIG. 5, or FIG. 16 is displayed, and the chromaticity point set on the screen is set in the field 2003. If the user presses the color conversion generation button 2010, the color conversion table is generated by reflecting the contents set in each of the fields, based on the gray chromaticity point set by the user. This is as described in the first and second exemplary embodiments. The color conversion table is thus generated in the external storing unit 103 under the file name designated in the field 2004.

As described above, the color conversion table reflecting the gray line based on the set gray chromaticity point can be generated. The user can thus cause color conversion to be performed on the image data to be output using the generated color conversion table, and then cause the output device to output the image. When the user sets the gray chromaticity point in the first exemplary embodiment, the user may use the screen illustrated in FIG. 16 according to the second exemplary embodiment and set the chromaticity point.

According to the first and second exemplary embodiments, color conversion is performed using the color conversion table corresponding to the chromaticity point designated by the user as described with reference to FIGS. 4 and 5.

Figure 19:
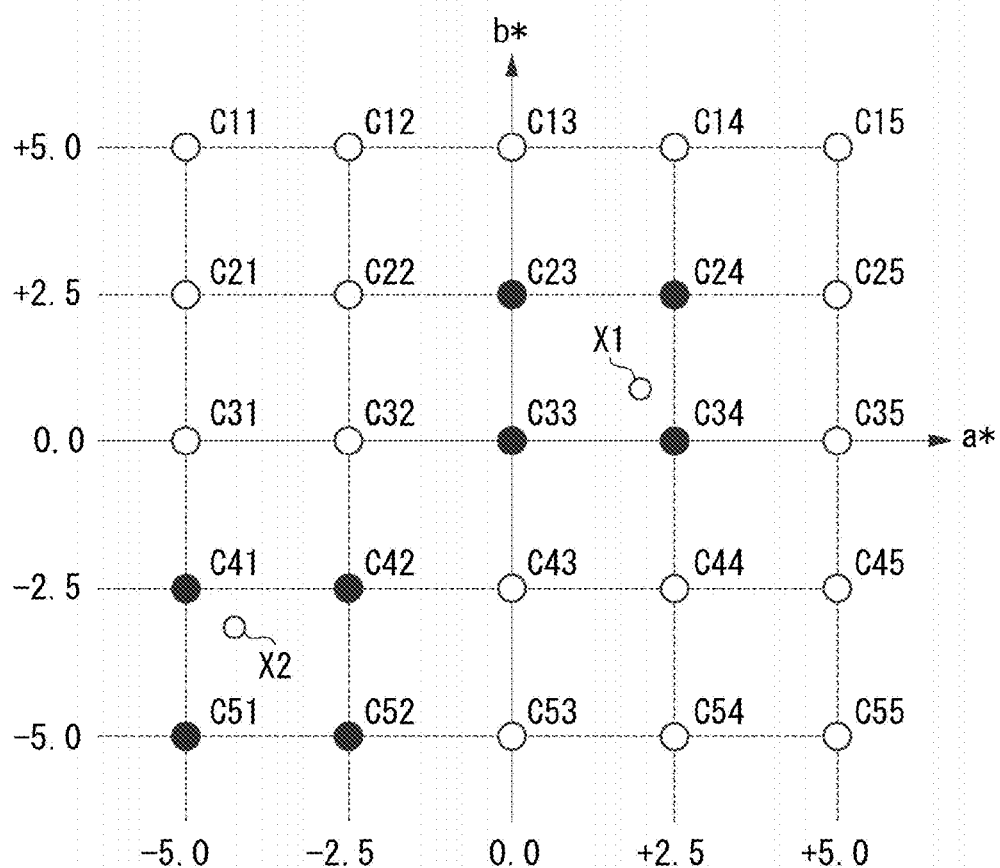
FIG. 19 illustrates an example of the case where a chromaticity point other than a predetermined chromaticity point has been designated.

However, if the color conversion table corresponding to the chromaticity point designated by the user is not previously provided, it becomes necessary to newly generate the table corresponding to the designated chromaticity point. It becomes necessary to newly generate the table when the user can designate an arbitrary value as the chromaticity point, and the designated value does not correspond to the previously prepared table. Further, it becomes necessary to newly generate the table when the tables corresponding to all of the 25 types of chromaticity points designated in FIGS. 4 and 5 are not prepared, and the user designates the chromaticity point corresponding to the table that has not been prepared. Hereinafter, it is assumed that the above-described tables (i.e., predetermined tables) corresponding to the 25 types of chromaticity points are prepared, and the user can designate as the chromaticity point an arbitrary value (i.e., a value other than the previously prepared 25 patterns). The process performed in the case where the designated chromaticity point does not correspond to the previously prepared table will be described below. As illustrated in FIG. 19, there are 25 previously prepared tables corresponding to the chromaticity points (i.e., the upper limit of a*, b* is +5, and the lower limit of a*, b* is −5), on the points (i.e., predetermined points) indicated as points from a point C11 to a point C55. If the value of the chromaticity point designated by the user is a point X1 or a point X2, the chromaticity point does not match the preset 25 types of chromaticity points. In such a case, the color conversion tables corresponding to the 25 types of chromaticity points cannot be used.

According to a third exemplary embodiment of the present invention, if the user has designated the chromaticity point other than the prepared 25 types of chromaticity points, the color conversion table selection unit 206 performs processes as follows. The color conversion table selection unit 206 selects the color conversion tables respectively corresponding to four chromaticity points surrounding the designated chromaticity point, combines the selected color conversion tables, and generates a new table. For example, if the user designates the point X1 illustrated in FIG. 19, the color conversion table selection unit 206 combines the color conversion tables respectively corresponding to a point C23, a point C24, a point C33, and a point C34 surrounding the point X1. The color conversion table selection unit 206 then transmits to the color conversion unit 210 the combined color conversion table. The color conversion table selection unit 206 performs similar processes as in the first and second exemplary embodiments other than the process of combining the color conversion table.

Figure 20:
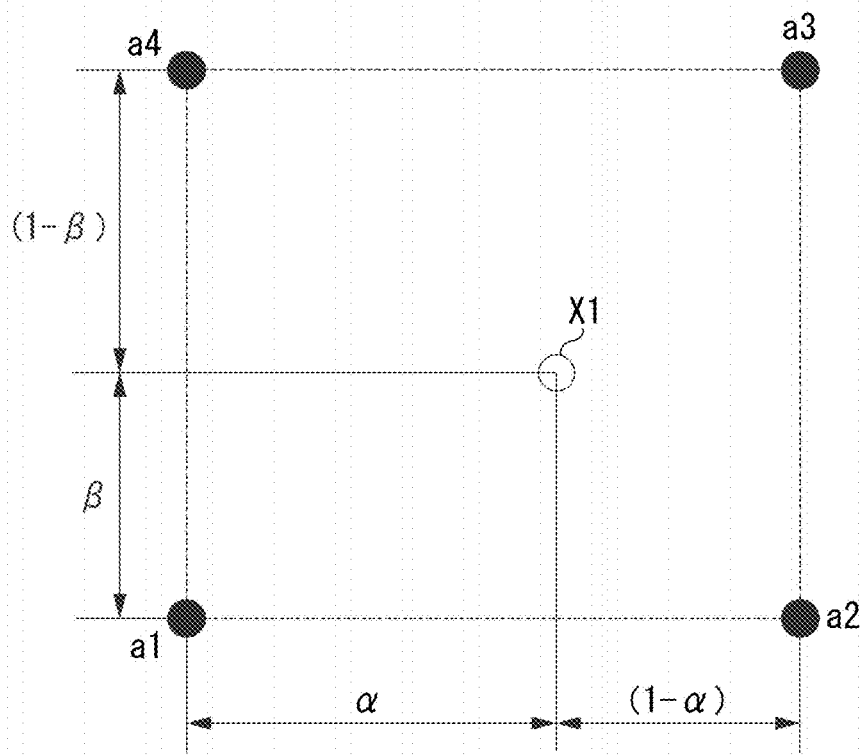
FIG. 20 illustrates combining of the color conversion tables.

FIG. 20 illustrates the process for combining the color conversion tables. Referring to FIG. 20, a point a1, a point a2, a point a3, and a point a4 respectively correspond to the point C33, the point C34, the point C24, and the point C23 illustrated in FIG. 19. Further, distances between the point X1 and each of the four points surrounding the point X1 are expressed using $\alpha$ and $\beta$. In other words, when the distance between each of the four points on the a* axis and the b* axis is set to 1, the position of the point X1 is indicated by a ratio with respect to the distance "1".

It is assumed that the values of each of the grid points of R, G, and B in the color conversion table (3D-LUT) corresponding to each of the four points are R (i), G (i), and B (i), respectively. If i indicates the position of each of the 16 grid points of R, G, and B, i becomes a value between 0 and 15. In such a case, the values of each of the grid points of R, G, and B in the color conversion table corresponding to point a1 are indicated as Ra1 (i), Ga1 (i), and Ba1 (i). Further, the values of each of the grid points of R, G, and B in the color conversion table corresponding to point a2 are indicated as Ra2 (i), Ga2 (i), and Ba2 (i). Furthermore, the values of each of the grid points of R, G, and B in the color conversion table corresponding to point a3 are indicated as Ra3 (i), Ga3 (i), and Ba3 (i). Moreover, the values of each of the grid points of R, G, and B in the color conversion table corresponding to point a4 are indicated as Ra4 (i), Ga4 (i), and Ba4 (i). Further, the values of each of the grid points of R, G, and B in the color conversion table corresponding to point X1 designated by the user are indicated as RX (i), GX (i), and BX (i).

According to the present exemplary embodiment, RX (i), GX (i), and BX (i) are respectively calculated using the following equations (1), (2), and (3):

$$RX(i)=Ra1(i)(1-\alpha)(1-\beta)+Ra2(i)\alpha(1-\beta)+Ra3(i)\alpha\beta+Ra4(i)(1-\alpha)\beta \quad (1)$$

$$GX(i)=Ga1(i)(1-\alpha)(1-\beta)+Ga2(i)\alpha(1-\beta)+Ga3(i)\alpha\beta+Ga4(i)(1-\alpha)\beta \quad (2)$$

$$BX(i)=Ba1(i)(1-\alpha)(1-\beta)+Ba2(i)\alpha(1-\beta)+Ba3(i)\alpha\beta+Ba4(i)(1-\alpha)\beta \quad (3)$$

In equations (1), (2), and (3), an influence rate of each of the four points with respect to point X1 is weighted. For example, the influence rate from the point a1 decreases as the distance to the point X1 increases, and increases as the distance to the point X1 decreases. Similarly, the influence rates from the points a2 and a3 decrease as the distance to the point X1 increases, and increase as the distance to the point X1 decreases. The sum of a product of the coordinate value of the point a1 and a coefficient $(1-\alpha)\times(1-\beta)$, a product of the coordinate value of the point a2 and a coefficient $\alpha\times(1-\beta)$, a product of the coordinate value of point a3 and a coefficient $\alpha\times\beta$, and a product of the coordinate value of the point a4 and a coefficient $(1-\alpha)\times\beta$ is obtained. Such a sum can be used as a value which includes the influence rates from each of the four points. The equations (1), (2), and (3) are thus equations for calculating the coordinate values for each of R, G, and B based on the above-described conditions.

In the above-described example, the color conversion tables are combined based on the four points. However, the color conversion tables may be combined based on three closest points among the four points surrounding point X, based on a similar method. Further, if the designated chromaticity point is on the line connecting the predetermined points between the point C11 to the point C55 with each other, the color conversion table may be obtained from the two points located in front of and behind the designated point or above and below the designated point on the line. Furthermore, according to the present exemplary embodiment, the color conversion tables defined on the RGB space are directly combined in generating the new table. However, other methods may be used. For example, the color conversion tables corresponding to the four points or the three points are converted into the coordinates in an equi-hue color space such as the L*a*b* space or the JCh space based on output color reproduction information corresponding to RGB input, and are then combined. The combined table may then be returned to the original RGB values. Further, if the number of tables to be previously prepared is 24 or less, and the chromaticity point not corresponding to the prepared table is designated, the new table can be similarly generated. Furthermore, if the designated chromaticity point cannot be surrounded (i.e., the table corresponding to the upper limit or the lower limit is not prepared), the coordinate values may be calculated using the predetermined point near the designated chromaticity point. Moreover, the calculation method of the coordinate values is not limited to the above, and other methods may be employed.

According to the above-described exemplary embodiments, the black point on the gray line is set as the point Js, which becomes the minimum lightness point on the line connecting the point Gk and the point Jk, as described in step S705 to step S707 illustrated in FIG. 7 and step S1505 illustrated in FIG. 15. The point Gk is the first minimum lightness point and the point Jk is the second minimum lightness point on the outermost shell of the color gamut 900. According a fourth exemplary embodiment of the present invention, the user can arbitrarily change the black point between the point Gk and the point Jk on the outermost shell of the color gamut 900.

FIG. 21 illustrates an example of a setting screen 2100 for the user to arbitrarily set the black point on the gray line. Referring to FIG. 21, the setting screen 2100 is displayed on the display unit 106 in the image processing apparatus 100.

For example, the setting screen 2100 is displayed after the user has specified the gray chromaticity point setting on the screen illustrated in FIG. 16. A point B1 in FIG. 21 corresponds to the point Gk (i.e., the minimum lightness point on the gray chromaticity point), and a point B2 corresponds to the point Jk (i.e., the minimum lightness point on the L axis). Further, the point W corresponds to the white point, the point G corresponds to the gray chromaticity point, and a point Mbk corresponds to a darkest point in the output color gamut. The points are specified as in the above-described exemplary embodiments.

The user can operate a slide bar 2104 using the operation unit 104 (e.g., the pointing device, the keyboard, or a finger (in the case of a touch panel)) and set the black point on a desired position between the point B1 and the point B2. A black point 2102 on an a* b* plane 2101 and a black point 2103 on the color gamut 900 on the setting screen 2100 also move along with the user operation on the slide bar 2104. The black points 2102 and 2103 are changed on a curve along the outer most shell of the color gamut 900 between the point B1 and the point B2. The user then presses an OK button 2105 at the desired position, and sets the black point at that position as the black point on the gray line. Further, if the user presses a cancel button 2106, the setting of the black point is cancelled, and the screen returns to the previous screen.

When the user sets the black point as described above, a preview image of a sample image may be displayed, so that the user can confirm a visual change corresponding to the black point to be set and determine the black point at the desired position.

As described above, the user can arbitrarily change the black point on the gray line set based on the previously prepared print settings (e.g., the type of paper, the print quality, and the color mode set in FIG. 3). Further, the user can arbitrarily change the black point on the gray line set based on the previously prepared existing gray chromaticity point (e.g., the chromaticity point corresponding to the monochrome mode selected in FIG. 5). The color conversion table based on the black point designated by the user as described above can thus be generated. As a result, the gray color tone which reduces occurrence of the color transition in the low lightness area of the gray line can be set, and the output image can be acquired by performing color conversion reflecting the user preference.

According to the above-described exemplary embodiments, the chromaticity setting uses the CIE L*a*b* color space. However, other color spaces may be used.

Further, the above-described exemplary embodiments may be combined as appropriate. According to the above-described exemplary embodiments, when the black color material and the other color materials (i.e., cyan, magenta, and yellow) are mixed and the gray image is to be recorded, hue distortion (i.e., unnatural switching) generated between black and gray can be reduced. Further, the above-described exemplary embodiments may be realized by a printer driver for a printer, running on the PC connected to the printer, application software for generating the color conversion table, a program operating on the printer, and a hardware circuit. Furthermore, the above-described exemplary embodiments may also be realized by a server disposed in a network, a controller apparatus separately arranged from a printer, and an interface device.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2012-175409 filed Aug. 7, 2012, No. 2012-175410 filed Aug. 7, 2012, and No. 2013-114245 filed May 30, 2013, which are hereby incorporated by reference herein in their entirety.

What is claimed is:

1. An apparatus comprising:
a setting unit configured to set a chromaticity point serving as a gray reference in a color gamut of a color space that an output device is able to output;
a first specifying unit configured to specify a first minimum lightness point on a lightness axis of the chromaticity point set by the setting unit in the color gamut of the color space that the output device is able to output;
a second specifying unit configured to specify a second minimum lightness point that is achromatic in the color gamut of the color space that the output device is able to output; and
a generation unit configured to generate a gray line that passes through a black point that is a minimum lightness point on a line connecting the first minimum lightness point specified by the first specifying unit and the second minimum lightness point specified by the second specifying unit, the first minimum lightness point, and the chromaticity point set by the setting unit, wherein the gray line reaches a white point in the color gamut of the color space that the output device is able to output,
wherein the line connecting the first minimum lightness point and the second minimum lightness point is a line of an outermost shell of the color gamut.

2. The apparatus according to claim 1, further comprising a selection unit configured to select a color conversion table corresponding to the chromaticity point set by the setting unit, wherein a gray line of the color conversion table selected by the selection unit is the gray line generated by the generation unit.

3. The apparatus according to claim 2, further comprising a unit configured to generate a new color conversion table based on a plurality of color conversion tables selected by the selection unit.

4. The apparatus according to claim 1, wherein the setting unit set the chromaticity point according to a designated gray color tone.

5. The apparatus according to claim 1, wherein the setting unit sets a chromaticity point which is chromatic designated by a user.

6. The apparatus according to claim 1, further comprising a second generation unit configured to generate a conversion table used to convert input image data based on a color gamut of the input image data and the gray line generated by the generation unit.

7. The apparatus according to claim 1, further comprising a designation unit configured to designate an allowable range of a hue angle difference between the black point and the chromaticity point,
wherein the generation unit generates the gray line based on the allowable range of a hue angle difference designated by the designation unit.

8. A method for generating a gray line for outputting gray when causing an output device to output an image based on the image data, the method comprising:
setting a chromaticity point serving as a gray reference in a color gamut of a color space that the output device is able to output;
specifying a first minimum lightness point on a lightness axis of the set chromaticity point in the color gamut of the color space that the output device is able to output;
specifying a second minimum lightness point that is achromatic in the color gamut of the color space that the output device is able to output; and
generating a gray line that passes through a black point that is a minimum lightness point on a line connecting the first minimum lightness point and the second minimum lightness point, the first minimum lightness point, and the set chromaticity point and wherein the gray line reaches a white point in the color gamut of the color space that the output device is able to output,
wherein the line connecting the first minimum lightness point and the second minimum lightness point is a line of an outermost shell of the color gamut.

9. The method according to claim 8, further comprising selecting a color conversion table corresponding to the set chromaticity point,
wherein a gray line of the selected color conversion table is the generated gray line.

10. The method according to claim 9, further comprising generating a new color conversion table based on the selected plurality of color conversion tables.

11. The method according to claim 8, wherein the set chromaticity point is set according to a designated gray color tone.

12. The method according to claim 8, wherein the set chromaticity point is a chromaticity point which is chromatic designated by a user.

13. The method according to claim 8, further comprising generating a conversion table used to convert input image data based on a color gamut of the input image data and the generated gray line.

14. The method according to claim 8, further comprising:
designating an allowable range of a hue angle difference between the black point and the chromaticity point; and
generating a gray line based on the designated allowable range of a hue angle difference.

15. A non-transitory computer-readable storage medium storing a program that causes a computer to perform the method according to claim 8.

* * * * *